(12) United States Patent
Richtman

(10) Patent No.: US 7,139,462 B1
(45) Date of Patent: Nov. 21, 2006

(54) FIBER OPTIC GASKET AND ENCLOSURE

(75) Inventor: Mark P. Richtman, Novato, CA (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 11/247,407

(22) Filed: Oct. 11, 2005

(51) Int. Cl.
*G02B 6/00* (2006.01)
*H01R 33/945* (2006.01)

(52) U.S. Cl. ............... 385/137; 385/134; 385/136; 385/138; 439/577

(58) Field of Classification Search ........... 385/134, 385/135, 136, 137, 138, 139; 439/577
See application file for complete search history.

(56) References Cited

U.S. PATENT DOCUMENTS

| | | | |
|---|---|---|---|
| 5,511,798 A * | 4/1996 | Kawamoto et al. ........ 277/647 |
| 6,434,312 B1 | 8/2002 | Knighten ................. 385/134 |
| 6,469,244 B1 * | 10/2002 | Harrison et al. .......... 174/35 R |
| 6,713,672 B1 * | 3/2004 | Stickney ................. 174/35 GC |
| 2004/0246693 A1 * | 12/2004 | Lloyd et al. .............. 361/800 |

\* cited by examiner

*Primary Examiner*—Brian M. Healy
(74) *Attorney, Agent, or Firm*—Baker Botts L.L.P.

(57) ABSTRACT

A fiber optic gasket includes one or more apertures to individually retain optical fibers from one or more fiber optic cards positioned within an enclosure. A slit within the fiber optic gasket associated with each aperture facilitates placement of an optical fiber within an aperture. The fiber optic gasket includes a layer of conductive material for electromagnetic interference protection. When installed in the enclosure, the fiber optic gasket comes in contact with a door that is removably connected to the enclosure. An electromagnetic interference shield is provided at the interface between the door and the fiber optic gasket. Optical fibers can extend out of the enclosure without causing harmful electromagnetic energy from leaving or entering the enclosure.

15 Claims, 4 Drawing Sheets

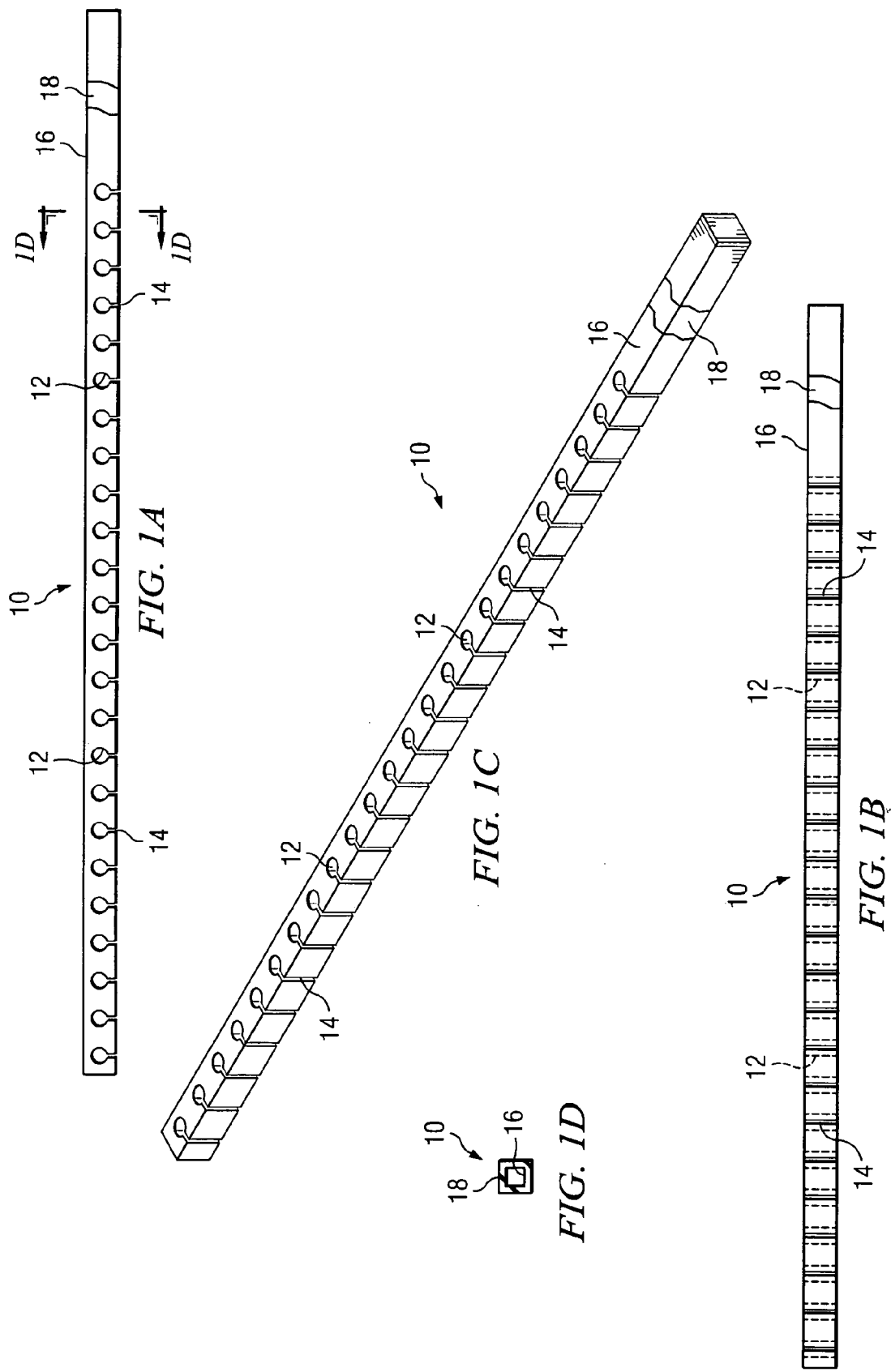

FIBER OPTIC GASKET AND ENCLOSURE

TECHNICAL FIELD OF THE INVENTION

The present invention relates in general to telecommunications equipment and more particularly to a fiber optic gasket and enclosure.

BACKGROUND OF THE INVENTION

Systems for transmitting large blocks of data in short intervals of time or transmitting high speed data over relatively long distances use fiber optic links. A common misperception associated with the use of fiber optic links is that fiber optic links eliminate all problems related to electromagnetic interference. Due to this misperception, most fiber optic implementations do not minimize the effect of electromagnetic interference.

Electro-magnetic interference may enter and leave a computer system in various ways. In particular, electro-magnetic interference may enter or leave a computer system enclosure through an electrical aperture associated with a fiber optic cable connector. The electrical aperture occurs between the fiber optic connector and the computer system enclosure because the fiber optic connector is constructed of plastic or similar non-conductive material while the computer system enclosure includes metal or other electrically conductive material. The electrical aperture is a common point of entry or exit for electro-magnetic energy in current systems with fiber optic links.

SUMMARY OF THE INVENTION

From the foregoing, it may be appreciated by those skilled in the art that a need has arisen for an electrically conductive enclosure that minimizes an amount of electromagnetic energy that can enter or exit when employing fiber optic links. In accordance with the present invention, a fiber optic gasket and enclosure are provided that substantially eliminate or greatly reduce disadvantages and problems associated with conventional fiber optic systems.

According to an example embodiment of the present invention, there is provided a fiber optic gasket that includes a structural material surrounded by a conductive material. An aperture is provided through the structural material and the conductive material for retention of an optical fiber. The fiber optic gasket may also include a slit associated with the aperture to facilitate insertion of the optical fiber into the aperture. The fiber optic gasket can be secured into an opening of an enclosure that includes a fiber optic card providing the optical fiber. A door is removably connected to the enclosure and comes in contact with the fiber optic gasket to provide an electromagnetic shield while allowing the optical fiber to extend out of the enclosure.

The present invention provides various technical advantages over conventional fiber optic systems. Some of these technical advantages are shown and described in the description of the present invention. Certain embodiments of the present invention may enjoy some, all, or none of these advantages. Other technical advantages may be readily apparent to those skilled in the art from the following figures, description, and claims.

BRIEF DESCRIPTION OF THE DRAWINGS

To provide a more complete understanding of the present invention and features and advantages thereof, reference is now made to the following description, taken in conjunction with the accompanying figures, wherein like reference numerals represent like parts, in which:

FIGS. 1A–1D illustrate respectively a top view, a side view, a perspective view, and a cross-section view of a fiber optic gasket according to an example embodiment of the present invention;

DETAILED DESCRIPTION OF THE INVENTION

Figure 2A:
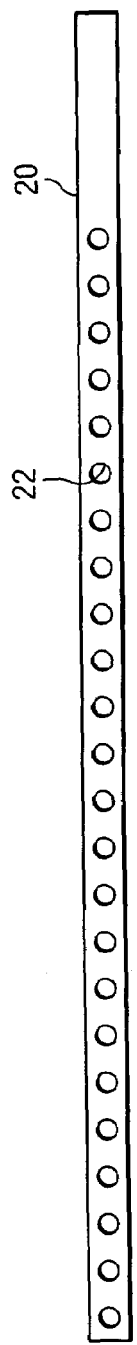
FIGS. 2A–2D illustrate alternative embodiments of the present invention.
Figure 2B:
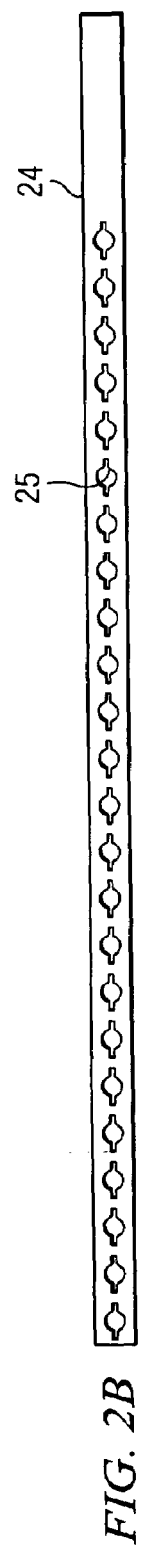
Figure 2C:
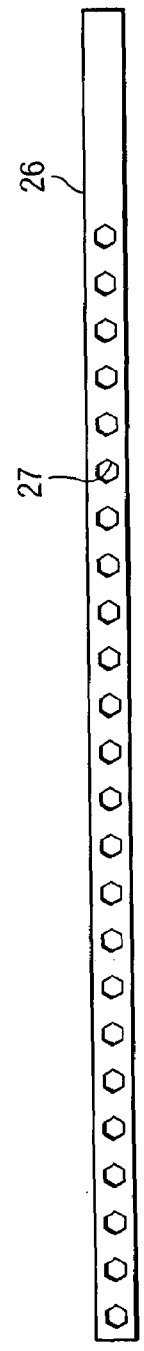
Figure 2D:
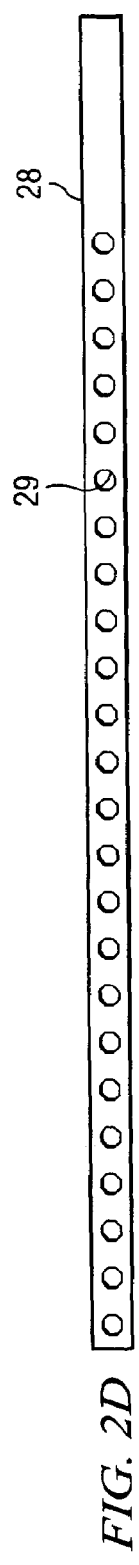

FIGS. 1A–1D are diagrams of a fiber optic gasket 10 according to an example embodiment of the present invention. Fiber optic gasket 10 includes one or more apertures 12. At each aperture 12, fiber optic gasket 10 may include a slit 14 that extends from aperture 12 to one side of fiber optic gasket 10. Alternatively, in another example embodiment, slit 14 is adjacent to aperture 12 but does not extend to one side of fiber optic gasket 10. Fiber optic gasket 10 includes structural material 16 that defines the shape and structural properties for fiber optic gasket 10. Structural material 16 may be made from any non-conductive or conductive matter as desired. For example, structural material 16 may be made from flexible foam. Surrounding structural material 16 is a layer of conductive material 18. Conductive material 18 may be applied to structural material 16 before or after apertures 12 and slits 14 are formed in fiber optic gasket 10. Alternatively, conductive material 18 may be impregnated into structural material 16 while maintaining the conductive capability for fiber optic gasket 10.

Each aperture 12 may hold an individual optical fiber. Separate optical fibers can be retained in place by their respective aperture. Each slit 14 facilitates placing an individual optical fiber in its associated aperture 12. As a result, each optical fiber can be individually isolated and physical management of a bundle of optical fibers can be provided by fiber optic gasket 10. Aperture 12 may take on any size or shape to accommodate the optical fiber.

FIGS. 2A–2D show alternative embodiments of the present invention. A fiber optic gasket 20 may be formed without slits 14 where an optical fiber is fed through an aperture 21 instead of inserted therein through a slit 14. Other embodiments of the fiber optic gasket may have different configurations for its apertures. For example, fiber optic gasket 24 has an aperture 25 with slits extending parallel to its length. Fiber optic gasket 26 has a octagon shaped aperture 27. Fiber optic gasket 28 has a hexagon shaped aperture 29. Other shapes for an aperture may be equally incorporated within a fiber optic gasket as desired.

Figure 3:
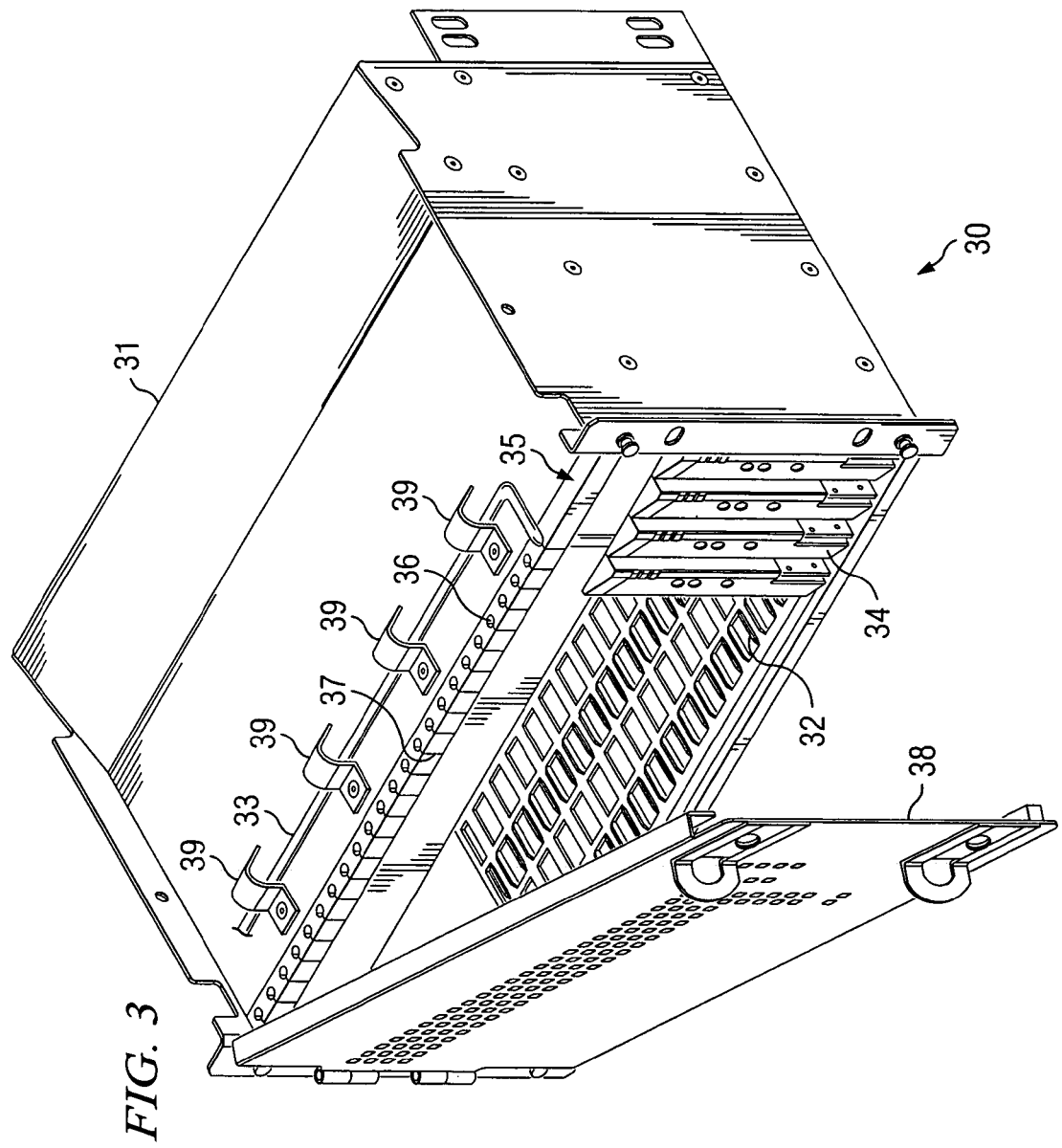
FIG. 3 illustrates a perspective view of an enclosure incorporating the fiber optic gasket according to an example embodiment of the present invention.

FIG. 3 is a simplified diagram of an enclosure 30. Enclosure 30 includes a chassis 31 having one or more slots 32 operable to hold a fiber optic card 34. Fiber optic card 34 may include an optical fiber 33 that can be fed through an aperture 36 of a fiber optic gasket 35 in order to optically transmit information to and receive information from fiber optic card 34. Fiber optic card 34 may have an optical connector coupled to the optical fiber. In this manner, the optical connector can be retained within enclosure 30 for greater electromagnetic interference protection. By avoiding the use of fiber optic connectors externally connected to enclosure 30, the common entry and exit point of an electrical aperture found in conventional systems is eliminated.

Fiber optic gasket 35 may be fastened and/or retained to enclosure 30 by any conventional means. A common way of attaching fiber optic gasket 35 to enclosure 30 is through the use of an adhesive material. Once installed in enclosure 30, conductive material 37 of fiber optic gasket 35 comes into contact with a door 38 of enclosure 30 when door 38 is secured to enclosure 30. Once secured, an electro-magnetic interference shield is provided by door 38 and fiber optic gasket 35 while still allowing optical fibers to extend outside of enclosure 30. Electro-magnetic energy can be prevented from entering or leaving enclosure 30 at fiber optic gasket 35.

With optical fibers extending from enclosure 30 and individually isolated from each other by fiber optic gasket 35, physical management of the optical fibers can be easily provided. Enclosure 30 may include one or more retaining brackets 39 or other similar hardware to physically retain a bundle of optical fibers and prevent individual optical fibers from straying away from enclosure 30. In this manner, the susceptibility to damage of the optical fibers is greatly reduced.

Figure 4:
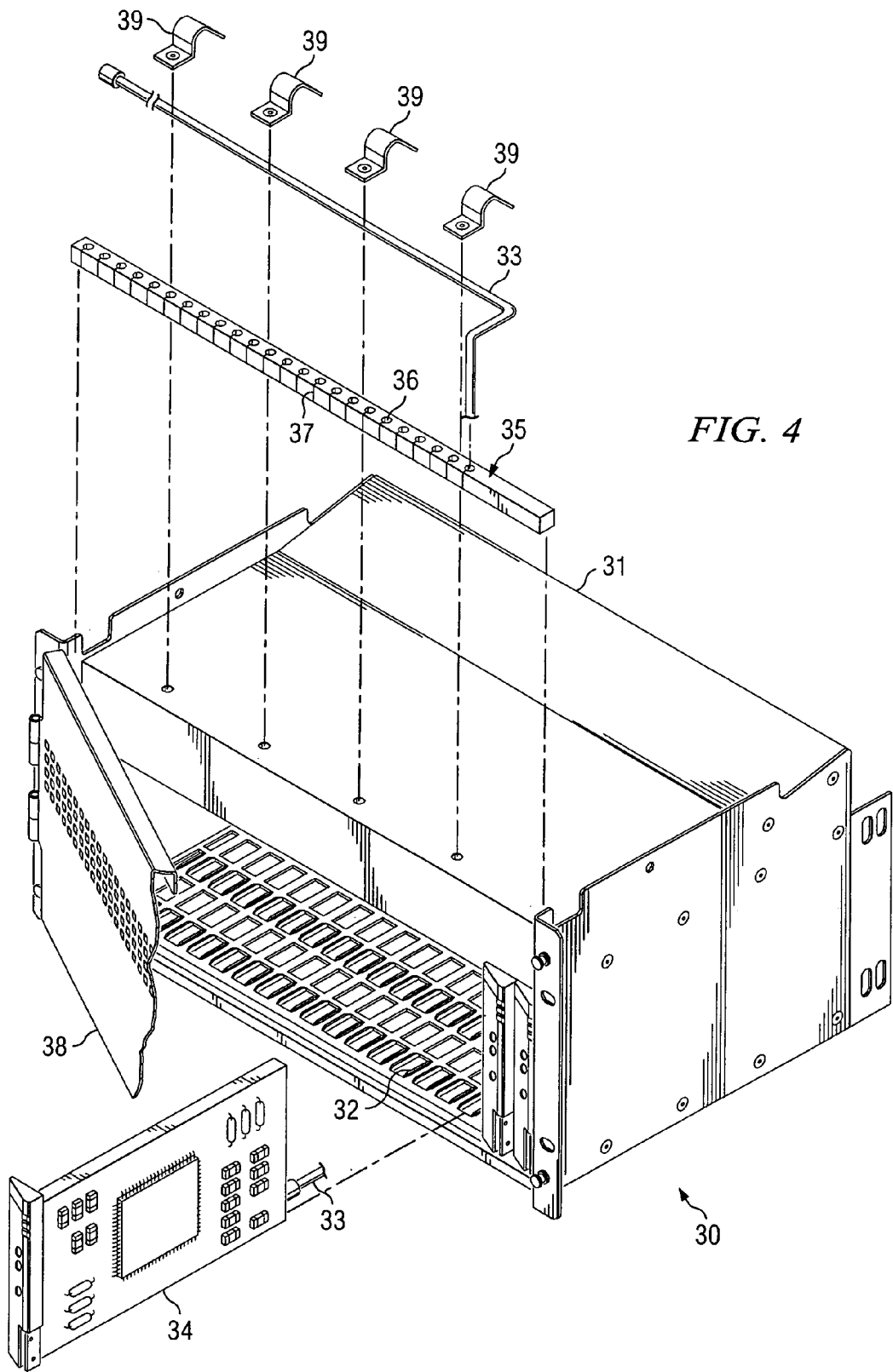
FIG. 4 illustrates an exploded view of an enclosure incorporating the fiber optic gasket according to an example embodiment of the present invention.

FIG. 4 shows an exploded view of an enclosure 40. Enclosure 40 includes similar components as found in enclosure 30 of FIG. 3 to include a chassis 41, a plurality of card slots 42, an optical fiber 43, a fiber optic card 44, a fiber optic gasket 45 with apertures 46 and conductive material 47, a door 48, and retaining brackets 49.

Thus, it is apparent that there has been provided, in accordance with the present invention, a fiber optic gasket and enclosure that satisfies the advantages set forth above. Although the present invention has been described in detail, various changes, substitutions, and alterations may be readily ascertainable by those skilled in the art and may be made herein without departing from the spirit and scope of the present invention as set out in the appended claims. Moreover, the present invention is not intended to be limited in any way by any statement made herein that is not otherwise reflected in the following claims.

What is claimed is:

1. A fiber optic gasket, comprising:
   a structural material;
   a conductive material surrounding the structural material;
   wherein the structural material and the conductive material have one or more apertures therethrough to facilitate retention of one or more optical fibers;
   wherein the one or more apertures extend through the structural material and the conductive material in a first direction but not in a second direction orthogonal to the first direction beyond a peripheral edge of the fiber optic gasket.

2. The fiber optic gasket of claim 1, wherein the structural material is made of flexible foam.

3. The fiber optic gasket of claim 1, wherein the one or more apertures include a slit.

4. An enclosure for a fiber optic system, comprising:
   a chassis;
   a fiber optic gasket operable to retain an optical fiber from a fiber optic card;
   a door operable to enclose the fiber optic card within the chassis, the door operable to contact the fiber optic gasket while secured to the chassis, the door and the fiber optic gasket providing an electromagnetic interference shield to prevent electromagnetic energy from entering or leaving the chassis;
   a retaining bracket operable to hold the optical fiber extending outside the chassis in place.

5. The enclosure of claim 4, further comprising:
   a fiber optic connector securing the optical fiber to the fiber optic card, the fiber optic connector being totally within the chassis when the door is secured thereto.

6. The enclosure of claim 4, wherein the fiber optic gasket is adhesively secured to the chassis.

7. The enclosure of claim 4, wherein the fiber optic gasket is operable to individually retain a plurality of optical fibers from a plurality of fiber optic cards in the chassis.

8. The enclosure of claim 4 wherein the fiber optic gasket includes:
   a structural material;
   a conductive material surrounding the structural material;
   wherein the structural material and the conductive material have one or more apertures therethrough to facilitate retention of one or more optical fibers.

9. The enclosure of claim 8, wherein the apertures extend through the structural material and the conductive material in a first direction but not in a second direction orthogonal to the first direction beyond a peripheral edge of the fiber optic gasket.

10. The enclosure of claim 8, wherein the structural material is made of flexible foam.

11. The fiber optic gasket of claim 8, wherein the one or more apertures include a slit.

12. A system for providing fiber optic communications, comprising:
   retention means for retaining an optical fiber that is removably connected to a fiber optic card;
   enclosure means for enclosing the fiber optic card and allowing the optical fiber to extend beyond the enclosure means, the enclosure means and the retention means providing an electro-magnetic interference shield to prevent electro-magnetic energy from entering or leaving the enclosure means at the retention means;
   a retaining bracket operable to hold the optical fiber extending outside the chassis in place.

13. The system of claim 12, further comprising:
   means for securing the retention means to the enclosure means.

14. The system of claim 12, further comprising:
   securing means for securing the optical fiber to the fiber optic card, the securing means being enclosed within the enclosure means.

15. The system of claim 12, wherein the retention means is operable to individually retain a plurality of optical fibers from a plurality of fiber optic cards within the enclosure means.

* * * * *